US011608746B2

(12) United States Patent
Hayek et al.

(10) Patent No.: US 11,608,746 B2
(45) Date of Patent: Mar. 21, 2023

(54) AIRFOILS FOR GAS TURBINE ENGINES

(71) Applicant: General Electric Company, Schenectady, NY (US)

(72) Inventors: Michael Elia Hayek, Wrentham, MA (US); Victor Hugo Silva Correia, Milton Mills, NH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/148,156

(22) Filed: Jan. 13, 2021

(65) Prior Publication Data

US 2022/0220855 A1 Jul. 14, 2022

(51) Int. Cl.
*F01D 5/20* (2006.01)
*F01D 5/18* (2006.01)
*F01D 25/12* (2006.01)

(52) U.S. Cl.
CPC ............... *F01D 5/20* (2013.01); *F01D 5/186* (2013.01); *F01D 25/12* (2013.01); *F05D 2220/32* (2013.01); *F05D 2240/30* (2013.01); *F05D 2240/306* (2013.01); *F05D 2240/307* (2013.01); *F05D 2260/202* (2013.01)

(58) Field of Classification Search
CPC . F01D 5/186; F01D 5/187; F01D 5/20; F05D 2240/306; F05D 2240/307
See application file for complete search history.

(56) References Cited

U.S. PATENT DOCUMENTS

| 4,142,824 | A | | 3/1979 | Andersen | |
|---|---|---|---|---|---|
| 5,261,789 | A | | 11/1993 | Butts et al. | |
| 5,660,523 | A | | 8/1997 | Lee | |
| 6,142,739 | A | * | 11/2000 | Harvey | F01D 5/20 |
| | | | | | 415/173.1 |
| 7,192,250 | B2 | | 3/2007 | Boury et al. | |
| 7,857,587 | B2 | | 12/2010 | Correia et al. | |
| 8,061,987 | B1 | | 11/2011 | Liang | |
| 8,414,265 | B2 | * | 4/2013 | Willett, Jr. | F01D 5/145 |
| | | | | | 416/228 |
| 8,632,311 | B2 | | 1/2014 | Klasing et al. | |
| 8,777,572 | B2 | * | 7/2014 | Cheong | F01D 5/20 |
| | | | | | 416/235 |
| 8,894,376 | B2 | | 11/2014 | Penny et al. | |
| 10,107,108 | B2 | | 10/2018 | Jones et al. | |
| 10,458,427 | B2 | * | 10/2019 | McGill | F04D 29/384 |
| 10,830,057 | B2 | * | 11/2020 | Beyer | F01D 5/20 |
| 2008/0044289 | A1 | | 2/2008 | Klasing et al. | |
| 2010/0221122 | A1 | | 9/2010 | Klasing et al. | |

(Continued)

*Primary Examiner* — Eldon T Brockman
(74) *Attorney, Agent, or Firm* — McGarry Bair PC

(57) ABSTRACT

An airfoil for a gas turbine engine defining a radial direction and an axial direction, the airfoil including: a flared portion extending from a suction surface of the airfoil at an outer edge of the airfoil along the radial direction; and a plenum disposed at the outer edge of the airfoil, the plenum having a suction-side sidewall and a pressure-side sidewall, wherein the suction-side sidewall has a first sidewall portion adjacent to a second sidewall portion disposed outside of the first sidewall portion along the radial direction, wherein the first sidewall portion defines a first angle, wherein the second sidewall portion defines a second angle, and wherein the first angle is greater than the second angle.

17 Claims, 6 Drawing Sheets

(56) References Cited

U.S. PATENT DOCUMENTS

| | | | |
|---|---|---|---|
| 2011/0091327 A1* | 4/2011 | Willett, Jr. | F01D 5/20 |
| | | | 416/235 |
| 2011/0255990 A1* | 10/2011 | Diamond | F01D 5/20 |
| | | | 416/97 R |
| 2012/0189458 A1* | 7/2012 | Cheong | F01D 5/20 |
| | | | 416/235 |
| 2015/0110617 A1 | 4/2015 | Stein et al. | |
| 2017/0058680 A1* | 3/2017 | Chouhan | F01D 5/18 |
| 2017/0167275 A1* | 6/2017 | Schroeder | F02C 7/18 |
| 2017/0218976 A1* | 8/2017 | McGill | F04D 29/384 |
| 2018/0347375 A1* | 12/2018 | Beyer | F01D 5/187 |

* cited by examiner

AIRFOILS FOR GAS TURBINE ENGINES

FEDERALLY SPONSORED RESEARCH

This invention was made with Government support under W58RGZ-16-C-0047 awarded by the U.S. Army. The Government has certain rights in this invention.

FIELD

The present subject matter relates generally to airfoils for gas turbine engines.

BACKGROUND

Gas turbine engines include a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan. Each turbine stage commonly includes a stationary turbine nozzle followed by a turbine rotor.

Each turbine rotor carries a circumferential array of airfoil-shaped turbine blades adapted to extract energy from the combustion gases exiting the core. These blades are typically constructed by casting from high-temperature resistant alloys (e.g. "superalloys"). The first rotor stage, immediately downstream of the combustor, is usually internally cooled and has a hollow interior with one or more serpentine passages, film cooling holes, trailing edge slots or holes, and the like. The subsequent rotor stages are not subject to the extreme high temperature of the first stage and thus may not require cooling or the same degree of cooling. To reduce the weight of the later-stage airfoils, they often include a hollowed-out portion referred to as a plenum.

The interface between the blade and shroud of the gas turbine engine affects the performance of the gas turbine engine. Accordingly, there is a need for a blade having low weight while maintaining high strength and having improved aerodynamic performance.

BRIEF DESCRIPTION

Aspects and advantages of the invention will be set forth in part in the following description, or may be obvious from the description, or may be learned through practice of the invention.

In one exemplary aspect of the present disclosure, an airfoil for a gas turbine engine defining a radial direction and an axial direction comprises a flared portion extending from a suction surface of the airfoil at an outer edge of the airfoil along the radial direction; and a plenum disposed at the outer edge of the airfoil, the plenum having a suction-side sidewall and a pressure-side sidewall, wherein the suction-side sidewall has a first sidewall portion adjacent to a second sidewall portion disposed outside of the first sidewall portion along the radial direction, wherein the first sidewall portion defines a first angle with a radial direction of the airfoil as measured by an average angular offset between the radial direction and the first sidewall portion, wherein the second sidewall portion defines a second angle with the radial direction of the airfoil as measured by an average angular offset between the radial direction and the second sidewall portion, and wherein the first angle is greater than the second angle.

In another exemplary aspect of the present disclosure, a gas turbine engine defining a radial direction comprises a shroud; and a turbine positioned at least partially inward of the shroud along the radial direction, the turbine having a plurality of turbine rotor blades, wherein at least one of the plurality of turbine rotor blades comprises a flared portion extending from a suction surface of the airfoil at an outer edge of the airfoil; and a plenum disposed at the outer edge of the airfoil, the plenum having a suction-side sidewall and a pressure-side sidewall, wherein the suction-side sidewall has a first sidewall portion adjacent to a second sidewall portion disposed radially outside of the first sidewall portion, wherein the second sidewall portion is approximately normal relative to an inner surface of the shroud, and wherein the first sidewall portion is angularly offset from the second sidewall portion.

In another exemplary aspect of the present disclosure, an airfoil for a gas turbine engine defining a radial direction and an axial direction comprising a flared portion extending from a suction surface of the airfoil along less than 20% of a radial length of the airfoil, as measured from an outer edge of the airfoil along the radial direction, wherein the flared portion extends less than 80% of a chord length, c, of the airfoil, as measured at the outer edge of the airfoil.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

DETAILED DESCRIPTION

Figure 1:
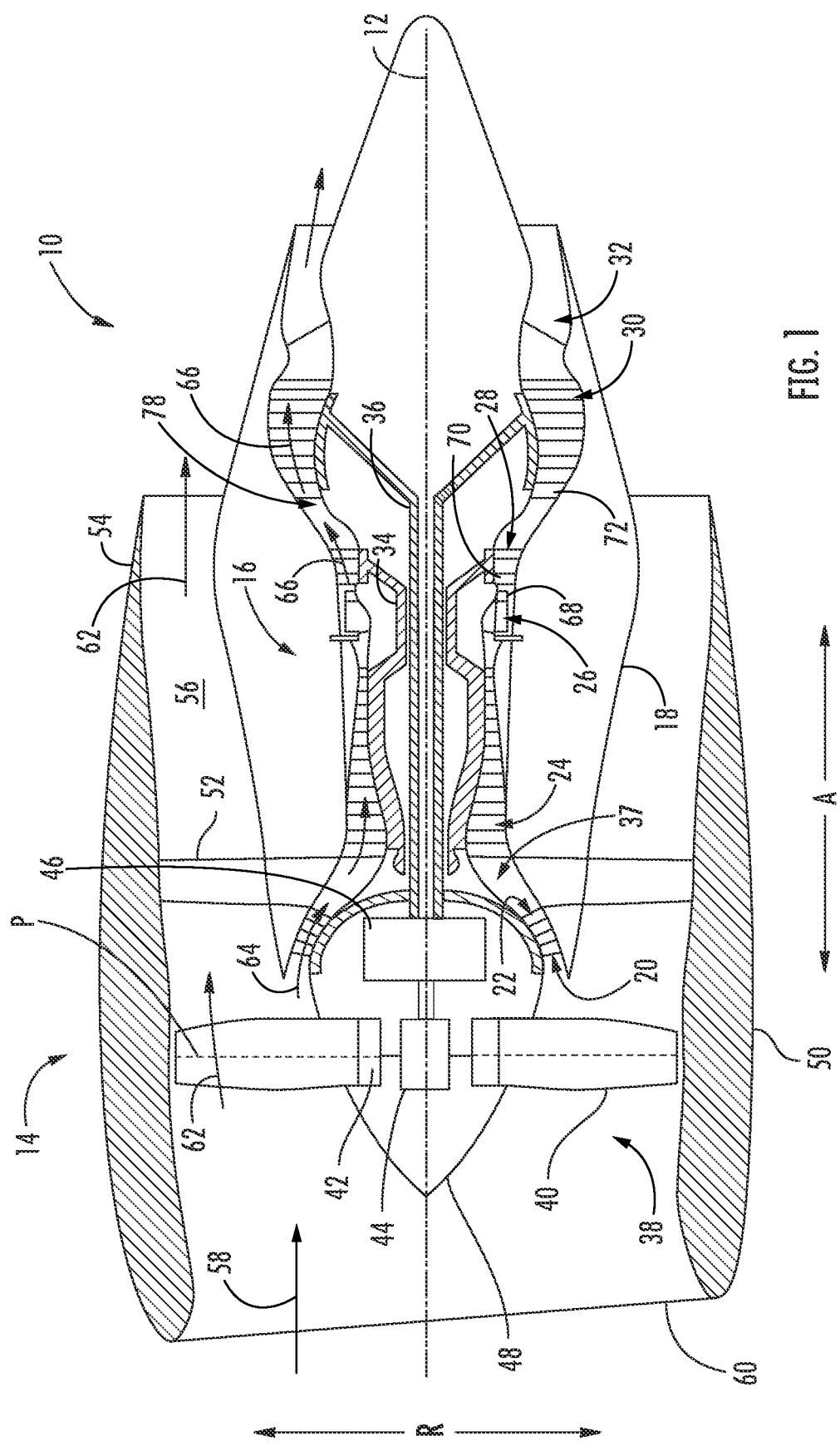
FIG. 1 is a schematic cross-sectional view of an exemplary gas turbine engine incorporating an exemplary embodiment of a turbine section according to an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, affixing, or attaching, as well as indirect coupling, affixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In general, rotor blades (referred to herein as airfoils) are used in gas turbine engines to convert between axial and rotational forces. Aerodynamic characteristics of airfoils can affect engine performance and efficiency. Airfoils described in accordance with embodiments herein can generally include flared portions along the suction surface sidewall. The flared portion can extend from the outer edge of the airfoil in an axial direction of the gas turbine engine, creating a desirable aerodynamic effect which increases engine performance and efficiency. In some embodiments, a plenum disposed at the outer edge of the airfoil can have a multi-segmented sidewall to further increase desirable aerodynamic characteristics while reducing unnecessary weight of the airfoil. In addition, one or more cooling elements, such as recesses and/or cooling holes, can extend from the radially outer surface of the airfoil to a cooling cavity in order to further enhance aerodynamic performance of the gas turbine engine.

Inclusion of an airfoil in accordance with such configuration including, e.g., a flared portion along the suction surface sidewall may result in a more aerodynamically capable airfoil, permitting increased engine performance and efficiency. Further, inclusion of an airfoil in accordance with other aspects of such a configuration may result in an airfoil having a reduced weight and increased cooling characteristics.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, and turbine section together define a core air flowpath 37 extending from the annular inlet 20 through the LP compressor 22, HP compressor 24, combustion section 26, HP turbine section 28, LP turbine section 30 and jet nozzle exhaust section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40, e.g., in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front spinner cone 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that for the embodiment depicted, the nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to an inner casing (not shown) and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of a plurality of LP turbine rotor blades 72. The plurality of LP turbine rotor blades 72 drive the LP shaft or spool 36, thus causing the LP shaft or spool 36 to rotate. Such thereby supports operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbine fan engine 10 may instead be configured as any other suitable turbomachine including, e.g., any other suitable number of shafts or spools, and excluding, e.g., the power gearbox 46 and/or fan 38, etc. Accordingly, it will be appreciated that in other exemplary embodiments, the turbofan engine 10 may instead be configured as, e.g., a turbojet engine, a turboshaft engine, a turboprop engine, etc., and further may be configured as an aeroderivative gas turbine engine or industrial gas turbine engine.

Figure 2:
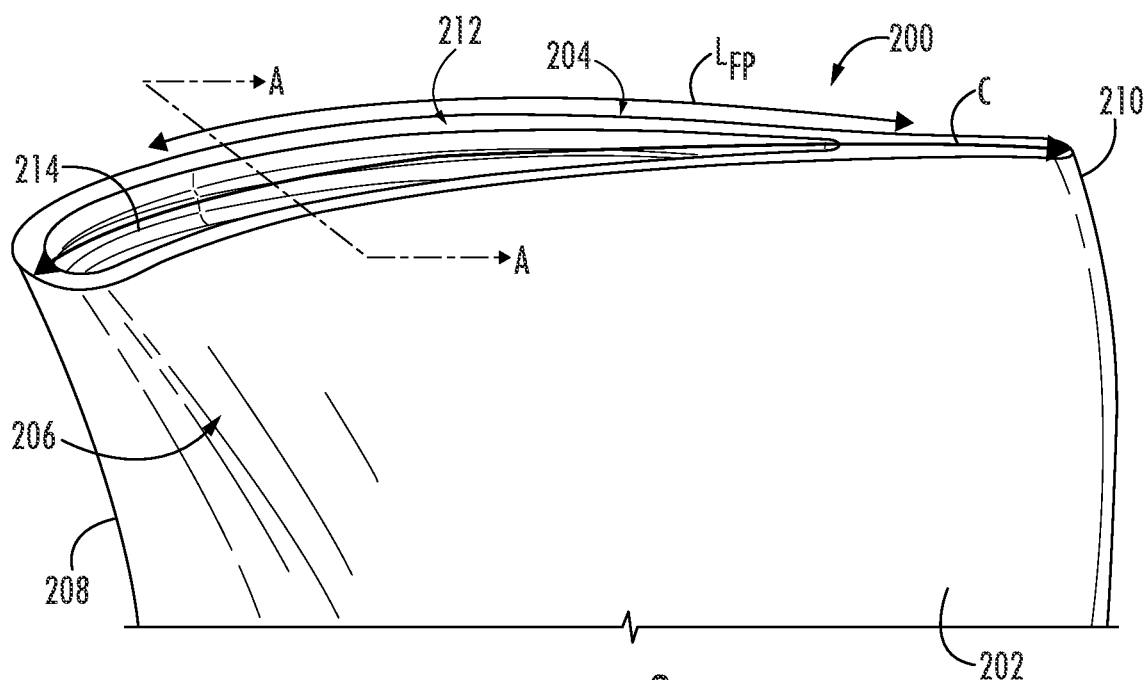
FIG. 2 is perspective view of a portion of an airfoil for a gas turbine engine according to an exemplary embodiment of the present disclosure.

FIG. 2 is a perspective view of a radially outer portion of an exemplary airfoil 200 in accordance with an exemplary embodiment described herein. Airfoils described herein can be one of a plurality of rotor blades of a turbine on a gas turbine engine, such as the turbofan jet engine 10 previously described with respect to FIG. 1. Alternatively, the airfoil can be one of a plurality of rotor blades of a compressor on a gas turbine engine. In yet other embodiments, the airfoil may be associated with another piece of equipment on an engine. In the installed state, the airfoil can extend from a central hub of the turbine or compressor radially outward toward a shroud of the gas turbine engine.

The airfoil 200 depicted in FIG. 2, generally includes a body 202 having a suction surface 204 (sometimes referred to as the upper surface) and a pressure surface 206 (sometimes referred to as the lower surface). The suction surface 204 and pressure surface 206 can generally correspond with the shape and operational movement, e.g., rotational direction, of the airfoil 200, with the suction surface 204 being generally associated with higher velocity and lower static pressure while the pressure surface 206 is associated with comparatively higher static pressure. The suction surface 204 and pressure surface 206 can define opposite sides of the airfoil 200 and can extend between an outer edge 212 of the airfoil 200 and a central hub of the turbine or compressor.

The body 202 of the airfoil 200 can include a leading edge 208 at the front of the airfoil 200 and a trailing edge 210 at the rear of the airfoil 200. A chord line is represented by a straight line connecting the leading edge 208 and trailing edge 210 together. The chord length, c, is the length of the chord line.

The body 202 of the airfoil 200 can extend between the central hub, e.g., of a turbine, and the outer edge 212 of the airfoil 200. When disposed within the previously described turbofan jet engine 10, the outer edge 212 of the airfoil 200 can be spaced apart from a shroud of the turbofan jet engine 10 by a small clearance, as described hereinafter. A plenum 214 can extend from the outer edge 212 of the airfoil 200 into the body 202 to create a void at the outer edge 212 of the airfoil 200. The void can define a volume, bounded by a plane defined by the outer edge 212. In the illustrated embodiment, the plenum 214 is surrounded on all lateral sides by a sidewall defined by the body 202.

The airfoil 200 is typically formed as a one-piece casting of a suitable superalloy, such as a nickel-, cobalt-, or iron-based superalloy, which has acceptable strength at the elevated temperatures of operation in a gas turbine engine. The plenum 214 can serve to eliminate material in nonessential areas of the airfoil 200. This can result in reduction of the weight of the airfoil 200 which can have important benefits, including reductions both in operating stresses and material costs. Additionally, the plenum 214 may create one or more desirable aerodynamic characteristics with respect to the shroud of the gas turbine engine, as described hereinafter.

Figure 3:
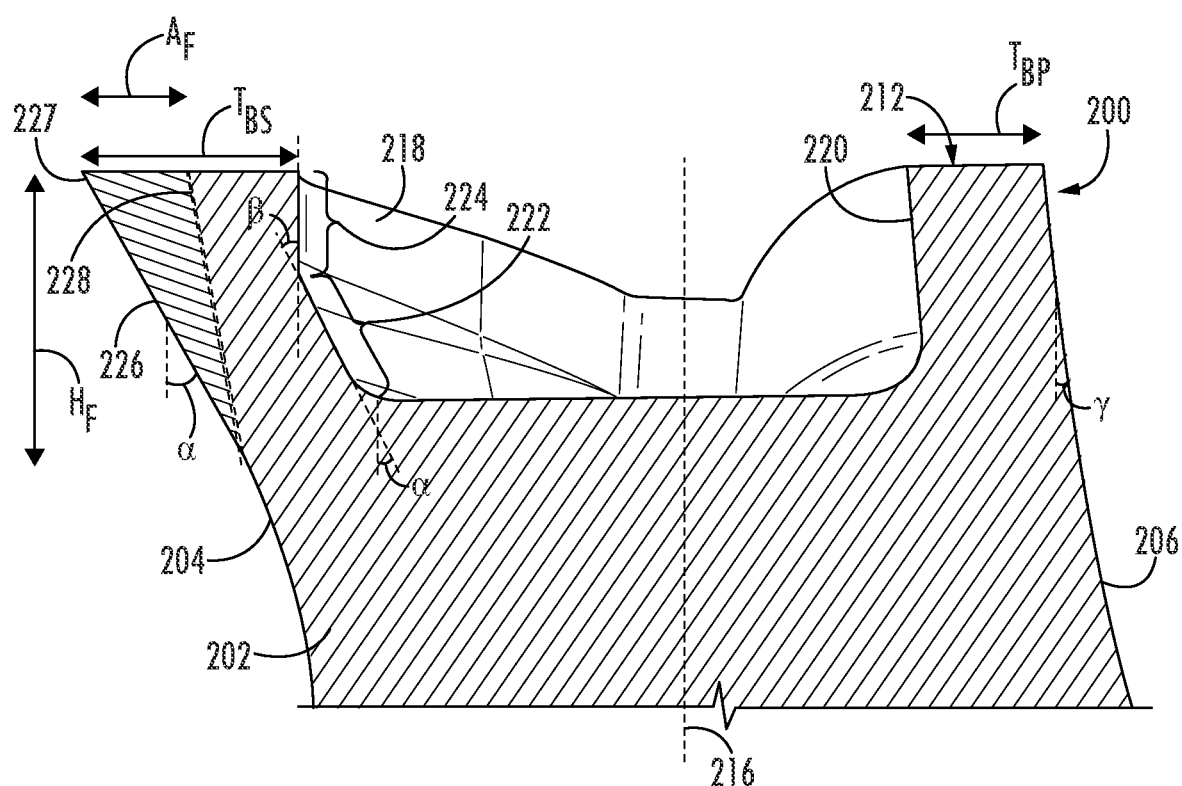
FIG. 3 is a cross-sectional view of the airfoil as seen along Line A-A in FIG. 2 in accordance with an exemplary embodiment of the present disclosure.

FIG. 3 is a cross-sectional view of the airfoil 200 as seen along Line A-A in FIG. 2. As depicted in FIG. 3, the airfoil 200 can have a radial direction 216 which defines a center line of the body 202 as measured normal to the central hub at a location from which the airfoil 200 extends from. The radial direction 216 may be oriented generally perpendicular, i.e., normal, to an inner surface of the shroud of the gas turbine engine when the airfoil 200 is disposed therein. In the illustrated embodiment, the radial direction 216 intersects the plenum 214. The radial direction 216 is depicted as being normal to the outer edge 212 of the airfoil 200. In certain instances, the radial direction 216 may be defined as a line perpendicular relative to the outer edge 212 of the airfoil 200.

The plenum 214 can define a void disposed between a suction-side sidewall 218 and a pressure-side sidewall 220 of the body 202. The suction-side sidewall 218 can correspond with the side of the plenum 214 disposed nearest to the suction surface 204 while the pressure-side sidewall 220 can correspond with the side of the plenum 214 disposed nearest to the pressure surface 206. The suction-side sidewall 218 and pressure-side sidewall 220 can join together at opposite ends to form the laterally bounded plenum 214.

In the depicted embodiment, the suction-side sidewall 218 includes two segments—a first sidewall portion 222 and a second sidewall portion 224. The second sidewall portion 224 can be disposed adjacent to and radially outside of the first sidewall portion 222. In an embodiment, the second sidewall portion 224 can extend between the first sidewall portion 222 and the outer edge 212.

In an embodiment, the first sidewall portion 222 and second sidewall portion 224 can be immediately adjacent to one another and meet at a junction line extending into the page. In certain instances, the junction line can be spaced apart from the outer edge 212 of the airfoil 200 by a fixed distance, as measured along the length of the junction line. In other instances, the distance between the junction line and the outer edge 212 of the airfoil 200 can vary along the junction line. For example, the first sidewall portion 222 can have a first radial height, as measured parallel with the radial direction 216, at a first location of the plenum 214, and a second radial height, as measured parallel with the radial direction 216, at a second location of the plenum 214, wherein the first and second radial heights are different from one another. To create the variable height of the first sidewall portion 222, the height of the second sidewall portion 224 can inversely change, the depth of the plenum 214 can change, or both.

In an embodiment, the first and second sidewall portions 222 and 224 can be angularly offset from one another by an angle, β. That is, the first and second sidewall portions 222 and 224 can lie along lines, as viewed in cross section (e.g., as depicted in FIG. 3), that intersect one another at the junction line. By way of example, the first and second sidewall portions 222 and 224 can be angularly offset from one another by an angle, β, of at least 1°, such as at least 2°, such as at least 3°, such as at least 4°, such as at least 5°, such as at least 10°, such as at least 15°, such as by at least 20°. In an embodiment, the second sidewall portion 224 can be parallel, or substantially parallel, with the radial direction 216 of the airfoil 200 while the first sidewall portion 222 can be angularly offset from the radial direction 216 by the aforementioned angular offset between the first and second sidewall portions 222 and 224. In an embodiment, the junction between the first and second sidewall portions 222 and 224 can occur at a sharp interface. In another embodiment, the junction between the first and second sidewall portions 222 and 224 can occur over a gradual transition, e.g., a rounded corner as viewed in cross section.

The pressure-side sidewall 220 is illustrated in FIG. 3 with a generally linear cross-sectional shape. The pressure-side sidewall 220 can be lie along a line parallel, or generally parallel, with the radial direction 216. Alternatively, the pressure-side sidewall can taper toward or away from the radial direction 216 at the outer edge 212. In another embodiment, the pressure-side sidewall 220 can have a non-linear cross-sectional shape, such as, for example, an arcuate cross-sectional shape, a segmented cross-sectional shape (e.g., similar to the suction-side sidewall 218), another non-linear cross-sectional shape, or any combination thereof. In the illustrated embodiment, a thickness of body 202, as measured between the pressure side 206 and the pressure-side sidewall 220, is shown as being generally constant. In other embodiments, the thickness of the body 202, as measured between the pressure side 206 of the airfoil 200 and the pressure-side sidewall 220 of the plenum 214 can vary as measured along the radial height of the body 202. In an embodiment, the pressure-side sidewall 220, or a portion thereof, can be parallel, or generally parallel, as viewed in cross section, with the second sidewall portion 224 of the suction-side sidewall 218.

The airfoil 200 can include a flared portion 226 extending from the suction side 204 of the airfoil 200. The flared portion 226 can extend from the body 202 of the airfoil in the axial direction (e.g., axial direction A as shown in FIG. 1). In an embodiment, the flared portion 226 can be integrally formed with the body 202 of the airfoil 200. That is, the body 202 of the airfoil 200 and flared portion 226 can be monolithically formed from a single piece. A dashed line 228 is shown in FIG. 3 to represent where traditional airfoils ends along the suction surface 204 in the axial direction. The flared portion 226 can introduce additional mass to the airfoil 200 along (i.e., adjacent to) the suction surface 204. In particular, the flared portion 226 can increase the mass of the airfoil 200 at the furthest radially outer portion of the body 202 (i.e., adjacent to the outer edge 212), thus having the greatest effect on the moment of inertia of the airfoil 200.

In an embodiment, the flared portion 226 can extend along less than 30% of a radial length of the airfoil 200, as measured between the outer edge 212 and the central hub of the airfoil 200, such as less than 25% of the radial length of the airfoil 200, such as less than 20% of the radial length of the airfoil 200, such as less than 19% of the radial length of the airfoil 200, such as less than 18% of the radial length of the airfoil 200, such as less than 17% of the radial length of the airfoil 200, such as less than 16% of the radial length of the airfoil 200, such as less than 15% of the radial length of the airfoil 200, such as less than 14% of the radial length of the airfoil 200, such as less than 13% of the radial length of the airfoil 200, such as less than 12% of the radial length of the airfoil 200, such as less than 11% of the radial length of the airfoil 200, such as less than 10% of the radial length of the airfoil 200. In a more particular embodiment, the flared portion 226 can extend along less than 8% of the radial length of the airfoil 200, such as along less than 6% of the radial length of the airfoil 200, such as along less than 4% of the radial length of the airfoil 200, such as along less than 2% of the radial length of the airfoil 200. As used herein, radial length is intended to refer to the length of the airfoil 200 in the radial direction as would be seen with the airfoil 200 operationally disposed within a gas turbine engine (e.g., the turbofan jet engine 10 depicted in FIG. 1). That is, reference to the radial direction is made with respect to an orientation of the airfoil 200 as part of a turbine or compressor within the gas turbine engine. In an embodiment, the flared portion 226 can extend from the outer edge 212 of the airfoil 200 toward the central hub. In a more particular embodiment, the flared portion 226 can be part of, i.e., define a portion of, the outer edge 212 of the airfoil 200.

In an embodiment, the flared portion 226 can extend along a distance less than the chord length, c, of the airfoil 200. That is, for example, referring again to FIG. 2, the length, $L_{FP}$, of the flared portion 226, as measured along the suction surface 204 can be less than the chord length, c, of the airfoil 200. By way of example, $L_{FP}$ can be less than 0.99 c, such as less than 0.98 c, such as less than 0.97 c, such as less than 0.96 c, such as less than 0.95 c, such as less than 0.9 c, such as less than 0.85 c, such as less than 0.8 c, such as less than 0.75 c. In an embodiment, $L_{FP}$ can be less than 0.7 c, such as less than 0.65 c, such as less than 0.6 c. In another embodiment, $L_{FP}$ can be at least 0.1 c, such as at least 0.15 c, such as at least 0.2 c, such as at least 0.3 c, such as at least 0.4 c. In yet another embodiment, $L_{FP}$ can be within a range of 0.1 c and 0.99 c, such as in a range of 0.25 c and 0.75 c. Flared portions 226 having lengths, $L_{FP}$, less than the chord length, c, can be referred to as mini flares. The flared portion 226 may be readily discernable on mini flares as the portion of the suction surface 204 disposed between the leading and trailing ends 208 and 210 and the mini flare will have a more traditional, i.e., non-flared, cross-sectional profile. In a particular instance, the flared portion 226 can be equally spaced apart from the leading and trailing ends 208 and 210 of the airfoil 200. In another instance, the flared portion 226 can be disposed closer to one of the leading and trailing ends 208 or 210. For example, the flared portion 226 can be skewed by up to 100% towards one of the leading and trailing ends 208 and 210.

In some embodiments, the flared portion 226 can define a linear cross-sectional surface profile, as seen for example in FIG. 3. That is, an exposed portion of the flared portion 226 can lie along a generally straight line as viewed in cross section. In other embodiments, the flared portion 226 can have an arcuate cross-sectional surface profile, such as a flared profile having an increasing cross-sectional surface profile angle, as measured, for example, with respect to the radial direction 216. In an embodiment, a tip 227 of the flared portion 226 may be sharp, e.g., an angled corner formed between the outer edge 212 of the airfoil 200 and the axial surface of the flared portion 226. In another embodiment, the tip 227 of the flared portion 226 can have a rounded or segmented cross-sectional profile.

In an embodiment, the flared portion 226 can elongate the outer edge 212 of the airfoil 200, as measured in the surface normal direction as compared to a traditional airfoil, by at least 0.1 mm, such as at least 0.5 mm, such as at least 1 mm, such as at least 2 mm, such as at least 5 mm. In another embodiment, the flared portion 226 can elongate the outer edge 212 of the airfoil 200, as measured in the axial direction as compared to a traditional airfoil, by at least 10 mm, such as at least 15 mm, such as at least 20 mm, such as at least 25 mm, such as at least 30 mm, such as at least 40 mm, such as at least 50 mm, such as at least 60 mm, such as at least 70 mm, such as at least 80 mm, such as at least 90 mm, such as at least 100 mm. In an embodiment, a thickness of body 202, $T_{BS}$, as measured between the suction surface 204 and the suction-side sidewall 218 at the outer edge 212 of the airfoil 200, can be greater than the thickness of the body 202, $T_{BP}$, as measured between the pressure side 206 and the pressure-side sidewall 220 at the outer edge 212 of the airfoil 200. For example, $T_{BS}$ can be at least 1.01 $T_{BP}$, such as at least 1.02 $T_{BP}$, such as at least 1.03 $T_{BP}$, such as at least 1.04 $T_{BP}$, such as at least 1.05 $T_{BP}$, such as at least 1.1 $T_{BP}$, such as at least 1.2 $T_{BP}$, such as at least 1.5 $T_{BP}$, such as at least 2 $T_{BP}$, such as at least 2.5 $T_{BP}$, such as at least 3 $T_{BP}$. In certain instances, $T_{BS}$ may be no greater than 10 $T_{BP}$, such as no greater than 5 $T_{BP}$.

In an embodiment, the flared portion 226 can define a height, $H_F$, as measured in a direction perpendicular to the chord, that is greater than a largest axial dimension of the flared portion 226, $A_F$, as measured at the outer edge 212 of the airfoil 200. By way of example, $H_F$ can be at least 1.01 $A_F$, such as at least 1.05 $A_F$, such as at least 1.1 $A_F$, such as at least 1.25 $A_F$, such as at least 1.5 $A_F$, such as at least 1.75 $A_F$, such as at least 2.0 $A_F$, such as at least 3.0 $A_F$, such as at least 4.0 $A_F$, such as at least 5.0 $A_F$, such as at least 10.0 $A_F$, such as at least 20.0 $A_F$.

The largest axial dimension of the flared portion 226, $A_F$, can be less than the thickness of the body 202, $T_{BS}$, as measured between the suction surface 204 and the suction-side sidewall 218. By way of example, $A_F$ can be less than 0.9 $T_{BS}$, such as less than 0.85 $T_{BS}$, such as less than 0.8 $T_{BS}$, such as less than 0.75 $T_{BS}$, such as less than 0.7 $T_{BS}$, such as less than 0.65 $T_{BS}$, such as less than 0.6 $T_{BS}$, such as less than 0.55 $T_{BS}$, such as less than 0.5 $T_{BS}$, such as less than 0.45 $T_{BS}$, such as less than 0.4 $T_{BS}$, such as less than 0.35 $T_{BS}$, such as less than 0.3 $T_{BS}$, such as less than 0.25 $T_{BS}$, such as less than 0.2 $T_{BS}$.

In an embodiment, the suction surface 204 at the flared portion 226 can lie along a line angularly offset from the radial direction 216 of the airfoil 200 by an angle, α. The first sidewall portion 222 can be angularly offset from the radial direction 216 by the same, or substantially same, angle, α. The suction surface 204 at the flared portion 226 can be generally parallel with the first sidewall portion 222 of the suction-side sidewall 218, as measured at a same radial distance from the outer edge 212. That is, $T_{BS}$ can be approximately equal at multiple, radially spaced apart planes intersecting the first sidewall portion 222 of the suction-side sidewall 218. This can occur where α is equal to β. Meanwhile, in accordance with an embodiment, $T_{BS}$ can be different at multiple, radially spaced apart planes intersecting the second sidewall portion 224 of the suction-side sidewall 218. For example, $T_{BS}$ can increase as the plane of measurement gets closer to the outer edge 212 of the airfoil 200. In certain instances, the rate of change of $T_{BS}$ relative to the radial distance relative to the outer edge 212 can determine the relative amount of flaring occurring at the flared portion 226.

Still referring to FIG. 3, in certain instances, the flared portion 226 can be identified by a relative angular displacement between the suction surface 204 and the pressure surface 206, as measured at an approximately same location in the radial R direction (FIG. 1). The pressure surface 206 can be angularly offset from the radial direction 216 by an angle, γ, that is less than the angle α of the flared portion 226. For example, a can be at least 5 degrees less than γ, such as at least 10 degrees less than γ, such as at least 15 degrees less than γ, such as at least 20 degrees less than γ, such as at least 25 degrees less than γ, such as at least 30 degrees less than γ, such as at least 35 degrees less than γ, such as at least 40 degrees less than γ.

Figure 4:
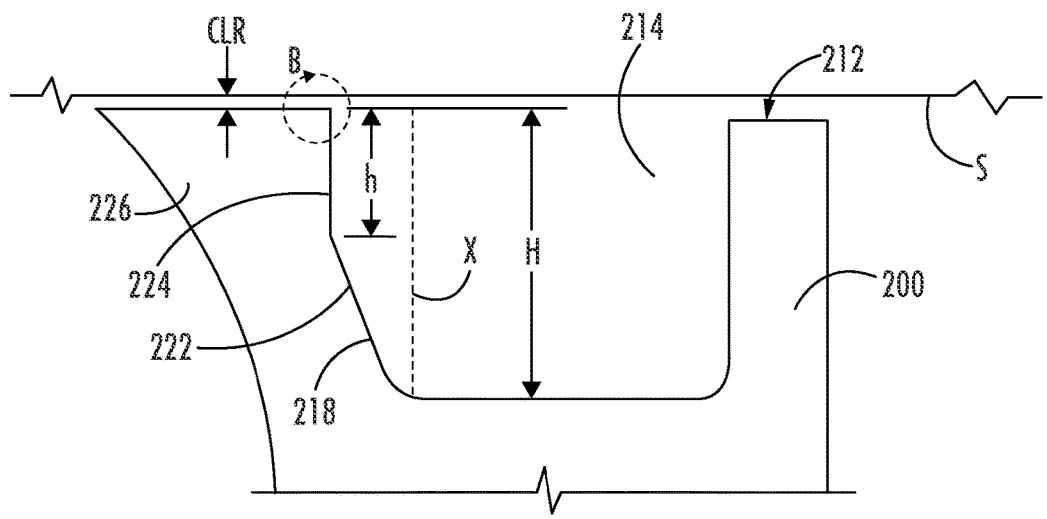
FIG. 4 is a cross-sectional view of a portion of an airfoil disposed within a gas turbine engine according to an exemplary embodiment of the present disclosure.

FIG. 4 illustrates a cross-sectional view of the airfoil 200 as seen in accordance with an embodiment. A shroud S of the gas turbine engine is shown to depict a relative spacing between the outer edge 212 of the airfoil 200 and the shroud S when the airfoil 200 is installed in a gas turbine engine. In the illustrated embodiment, the outer edge 212 of the airfoil 200 is spaced apart from the shroud S by a clearance, CLR. In an embodiment, clearance, CLR, may be measured at operating temperatures and conditions, e.g., when the airfoil 200 is subjected to centripetal forces acting upon the rotating airfoil 200 which might cause the body 202 of the airfoil 200 to elongate in the radial direction. In an embodiment, the clearance, CLR, can be at least 0.01 mm, such as at least 0.05 mm, such as at least 0.1 mm, such as at least 0.5 mm, such as at least 1 mm, such as at least 1.5 mm, such as at least 2 mm, such as at least 3 mm, such as at least 4 mm, such as at least 5 mm. The height, H, of the plenum 214 is shown as measured from the outer edge 212 of the airfoil 200 to a radially inner surface of the plenum 214. The height, h, of the second portion 224 is shown as measured from the outer edge 212. The height of the first sidewall portion 222 may be equal to the height, H, of the plenum 214 minus the height, h, of the second portion 224. In an embodiment, h/CLR is greater than 1.5, such as greater than 2, such as greater than 2.5, such as greater than 3, such as greater than 3.5, such as greater than 4, such as greater than 4.5, such as greater than 5. In this regard, the height of the second sidewall portion 224 can be greater than the clearance, CLR, between the outer edge 212 of the airfoil 200 and the shroud S. In certain instances, h/CLR can be impactful in affecting one or more aerodynamic characteristics of the airfoil 200, as described in greater detail hereinafter. While H/CLR may be impactful in affecting the aerodynamic characteristics of the airfoil 200, h/CLR being greater than 1.5 may improve the one or more aerodynamic characteristics while inclusion of the first sidewall portion 222 can minimize the resulting weight of the airfoil 200.

In an embodiment, the clearance, CLR, between the outer edge 212 of the airfoil 200 and the shroud S can be approximately uniform at all locations along the outer edge 212 of the airfoil 200. In another embodiment, the clearance, CLR, can vary along the outer edge 212. For instance, the clearance of the outer edge 212 as measured at the pressure surface 206 can be different from the clearance of the outer edge 212 as measured at the suction surface 204 or another location therebetween.

Figure 7:
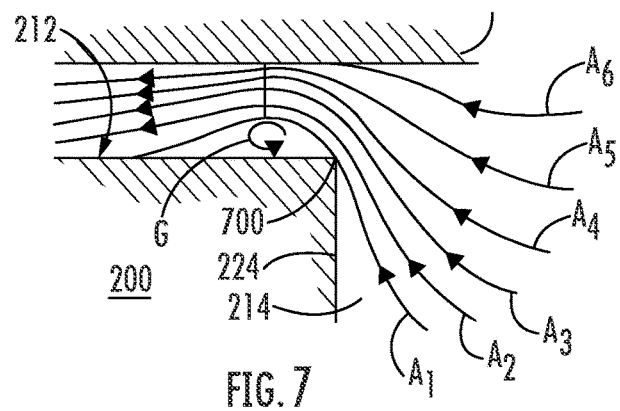
FIG. 7 is an enlarged view of a portion of the airfoil and gas turbine engine as seen in Circle B in FIG. 4 in accordance with an exemplary embodiment of the present disclosure.

FIG. 7 illustrates an enlarged view of an interface formed between the outer edge 212 of the airfoil 200 and an inner surface of the shroud S as seen in circle B in FIG. 4. Lines $A_1, A_2, A_3, A_4, A_5$, and $A_6$ illustrate exemplary flow paths of air from the plenum 214 as the air paths pass through the clearance, CLR, between the airfoil 200 and shroud S. The sharp edge 700 formed between the second sidewall portion 224 of the suction-side surface 218 of the plenum 214 and the outer edge 212 of the airfoil 200 can cause air passing between the airfoil 200 and shroud S to compress in the radial direction, generating the formation of an air gap G and a vena contracta effect where the air stream cross-sectional area is the smallest and the air velocity is the largest. Generation of the air gap G at the sharp edge 700, thereby creating the vena contracta effect, can enhance the aerodynamic characteristics of the airfoil 200, improving performance and aerodynamic efficiencies of the gas turbine engine. In this regard, having the second sidewall portion 224 generally normal with the shroud S and/or radial direction 216 can be beneficial for engine performance.

Figure 5:
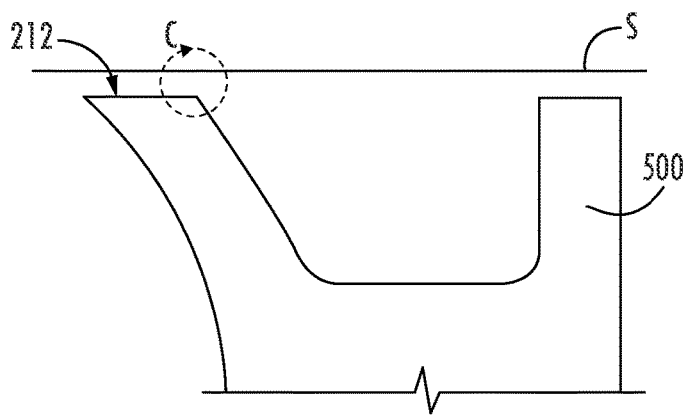
FIG. 5 is a cross-sectional view of a portion of an airfoil disposed within a gas turbine engine according to an exemplary embodiment of the present disclosure.
Figure 6:
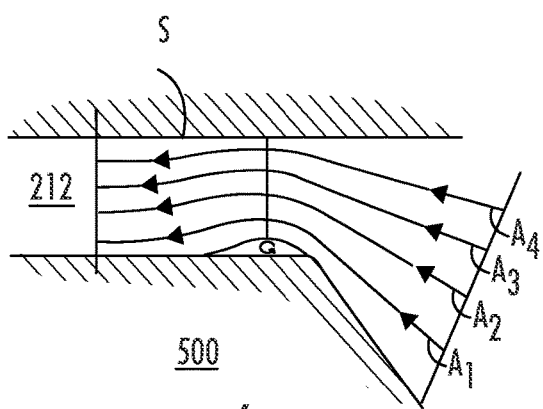
FIG. 6 is an enlarged view of a portion of the airfoil and gas turbine engine as seen in Circle C in FIG. 5 in accordance with an exemplary embodiment of the present disclosure.

In contrast, FIG. 5 illustrates an airfoil 500 without a plenum sidewall having an angle normal to the shroud S, as seen adjacent to the outer edge 212 of the airfoil 500. Instead, the plenum sidewall illustrated in FIG. 5 is generally linear and angularly offset from the radial direction 216 as measured at the outer edge 212. FIG. 6 illustrates an enlarged view of the interface formed between the airfoil 500 and shroud S as seen in Circle C in FIG. 5. As illustrated, the vena contracta effect of the airfoil 500 is diminished as compared to that exhibited by the airfoil 200 depicted in FIG. 7 as a result of the angularly offset plenum sidewall. Notably, the air gap G is reduced in size, resulting in a larger cross-sectional area for air to pass through the clearance between the outer edge 212 of the airfoil 500 and the shroud S. In turn, engine performance is reduced as the airfoil 500 is less aerodynamically efficient.

Accordingly, use of a sharp edge 700 (FIG. 7) is advantageous in creating a desirable aerodynamic characteristic. Referring again to FIG. 4, dashed line X depicts an exemplary view of the suction-side surface 218 with the entire surface oriented parallel with the radial direction 216. That is, unlike the suction-side surface 218 previously described including the first sidewall portion 222 and second sidewall portion 224, the dashed line X represents an example of the suction-side surface 218 if the entire radial height H of the suction-side surface 218 of the plenum 214 were oriented parallel with the radial direction 216 while affording sufficient strength to the flared portion 226. When using flared portions 226, the inclusion of such a linear side surface 218 adds unnecessary weight to the airfoil 200 at the radially outermost portion there along, most affecting the centripetal forces acting on the airfoil 200. Specifically, the wall thickness between the suction surface 204 and the side surface 218 of the plenum 214 becomes unnecessarily large as a result of including the flared portion 226.

Accordingly, use of a dual-angled suction-side surface 218, as depicted in FIG. 4 and as previously described, including first and second sidewall portions 222 and 224 can enhance aerodynamic performance while reducing unnecessary weight associated with an entirely linear suction-side surface 218 oriented parallel with the radial direction 216.

Figure 8:
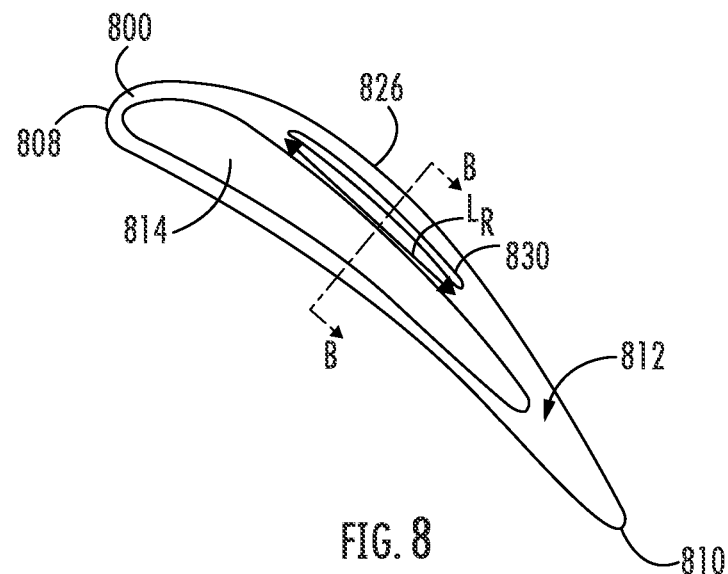
FIG. 8 is a top view of an airfoil as seen from an outer edge according to an exemplary embodiment of the present disclosure.

FIG. 8 illustrates a view of an airfoil 800 in accordance with an embodiment herein as seen along the radial direction of the airfoil 800 looking perpendicular to the outer edge 812 thereof. The airfoil 800 can have any one or more features similar to the airfoil 200 previously described. The plenum 814, for example, is depicted extending between the leading and trailing ends 808 and 810. Located adjacent to the plenum 814 is a recess 830 which extends from the outer edge 812 into the airfoil 800. The recess 830 is shown disposed between the plenum 814 and the flared portion 826. In an embodiment, the recess 830 extends a distance along the airfoil 200 less than a distance of the plenum 814. In another embodiment, the recess 830 and plenum 814 can have the same lengths, as measured between the leading and trailing ends 808 and 810. In yet another embodiment, the recess 830 can have a length greater than the length of the plenum 814.

Figure 9:
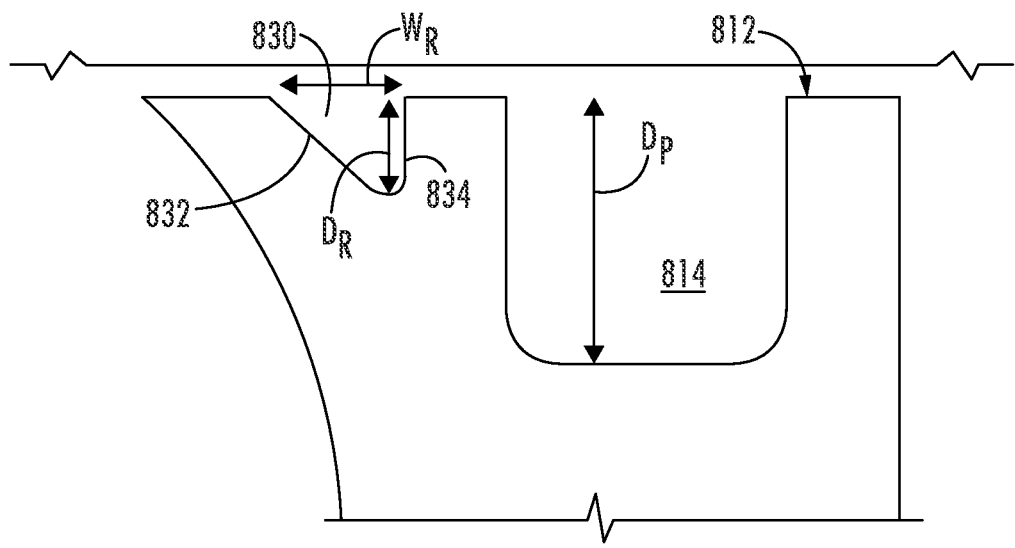
FIG. 9 is a cross-sectional view of the airfoil of FIG. 8 as seen along Line B-B according to an exemplary embodiment of the present disclosure.

FIG. 9 illustrates a cross-sectional view of the airfoil 800 shown in FIG. 8 as seen along Line B-B. The plenum 814 defines a depth $D_P$, as measured from the outer edge 812, greater than a depth, $D_R$, of the recess 830, as measured from the outer edge 812. In an embodiment, $D_P$ can be at least 1.01 $D_R$, such as at least 1.05 $D_R$, such as at least 1.1 $D_R$, such as at least 1.25 $D_R$, such as at least 1.5 $D_R$, such as at least 1.75 $D_R$, such as at least 2.0 $D_R$. In another embodiment, $D_P$ can be no greater than 200 $D_R$, such as no greater than 100 $D_R$, such as no greater than 25 $D_R$, such as no greater than 10 $D_R$. In some instances, the depth, $D_R$, of the recess 830 can be uniform, or generally uniform, along the entire recess 830. In other instances, the depth, $D_R$, of the recess 830 can vary along the recess 830. For example, the recess 830 can have a first depth, $D_{R1}$, at a first location, and a second depth, $D_{R2}$, at a second location different from the first location.

The recess 830 includes first and second sidewalls 832 and 834. The first sidewall 832 is shown with an angularly offset surface as compared to the radial direction of the airfoil 800 while the second sidewall 834 is shown with a surface generally parallel with the radial direction of the airfoil 800. In another embodiment, the first and second sidewalls 832 and 834 of the recess 830 can be parallel, or approximately parallel, with one another. In another embodiment, the second sidewall 834 (closer to the plenum 814) can be angularly offset from the radial direction of the airfoil 800 and the first sidewall 832 (closer to the flared portion 826) can be parallel with the radial direction of the airfoil 800.

In the illustrated embodiment, the first and second sidewalls 832 and 834 lie along generally straight lines, as seen in cross section. In another embodiment, at least one of the first and second sidewalls 832 and 834 can have an arcuate and/or multi-segmented sidewall contour. In an embodiment, an angle formed between the first and second sidewalls 832 and 834 can be at least 1°, such as at least 5°, such as at least 10°, such as at least 15°. In another embodiment, the angle between the first and second sidewalls 832 and 834 can be no greater than 89°, such as no greater than 60°, such as no greater than 45°.

The recess 830 can define an aspect ratio [$L_R$:$W_R$] as measured by a relative length, $L_R$, of the recess 830 as compared to a relative width, $W_R$, thereof. In an embodiment, the aspect ratio can be between approximately 500:1 and 2:1, such as between 100:1 and 2.5:1, such as between 50:1 and 3:1. The recess 830 can further define another aspect ratio [$L_R$:$D_R$] as measured by the relative length, $L_R$, of the recess 830 as compared to a relative depth, $D_R$, thereof. In an embodiment, the aspect ratio can be between approximately 100:1 and 5:1, such as between 750:1 and 10:1, such as between 500:1 and 20:1. In certain instances, the recess 830 can enhance performance of the airfoil 800, such as improve aerodynamic performance, along the outer edge 812.

Figure 10:
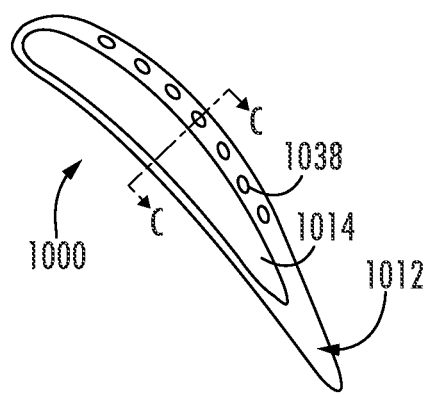
FIG. 10 is a top view of an airfoil as seen from an outer edge according to an exemplary embodiment of the present disclosure.
Figure 11:
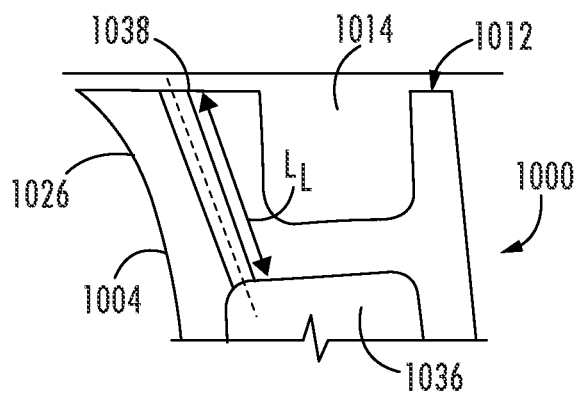
FIG. 11 is a cross-sectional view of the airfoil of FIG. 10 as seen along Line C-C according to an exemplary embodiment of the present disclosure.

FIGS. 10 and 11 illustrate an airfoil 1000 having any one or more similar characteristics as described with respect to the airfoils 200 and 800 previously described herein. For example, the airfoil 1000 can include a plenum 1014 extending from a outer edge 1012 of the airfoil 1000 and a flared portion 1026 at the suction surface 1004. FIG. 10 is an axial view of the airfoil 1000 as seen along the radial direction. FIG. 11 is a cross-sectional view of the airfoil 1000 as seen along Line C-C in FIG. 10.

In certain embodiments, the airfoil 1000 can include a cooling cavity 1036 disposed within the airfoil 1000. Use of a cooling cavity 1036 may be particularly useful for stage one turbine blades which operate within areas of the gas turbine engine having very high temperatures, e.g., areas of the gas turbine engine located adjacent to the combustion area. In an embodiment, the cooling cavity 1036 can include a single volumetric cavity. In another embodiment, the cooling cavity 1036 can include a plurality of cooling cavities, such as a plurality of interconnected cooling cavities. The cooling cavity 1036 can be in fluid communication with the outer edge 1012 of the airfoil 1000 through one or more cooling holes 1038. The one or more cooling holes 1038 can extend, for example, from the cooling cavity 1036 to the outer edge 1012 and pass between the plenum 1014 and flared portion 1026. The one or more cooling holes 1036 can define a length, $L_L$, as measured between the cooling cavity 1036 and the outer edge 1012. In an embodiment, all of the one or more cooling holes 1036 can have the same lengths, $L_L$, as compared to one another. In another embodiment, at least two of the one or more cooling holes 1036 can have different lengths, $L_L$, as compared to one another. The one or more cooling holes 1036 can define cross-sectional sizes, e.g., diameters, and/or shapes as measured normal to the length, $L_L$. In an embodiment, the one or more cooling holes 1036 can all have the same cross-sectional sizes and/or shapes as compared to one another. In another embodiment, at least two of the one or more cooling holes 1036 can have different cross-sectional sizes and/or shapes as compared to one another.

In an embodiment, the one or more cooling holes 1038 can include a single cooling hole 1036. In another embodiment, the one or more cooling holes 1038 can include at least two cooling holes, such as at least three cooling holes, such as at least four cooling holes, such as at least five cooling holes, such as at least six cooling holes, such as at least seven cooling holes, such as at least eight cooling holes, such as at least nine cooling holes, such as at least ten cooling holes, such as at least twenty cooling holes, such as at least fifty cooling holes. In an exemplary embodiment with a plurality of cooling holes 1038, at least three of the cooling holes 1038, such as all of the cooling holes 1038, can be equidistantly spaced apart from one another. In another exemplary embodiment with a plurality of cooling holes 1038, at least three of the cooling holes 1038, such as all of the cooling holes 1038 can be spaced apart from one another by different distances. For example, a first adjacent pair of cooling holes 1038 can be spaced apart by a first distance different than a distance between a second adjacent pair of cooling holes 1038.

As depicted in FIG. 11, in accordance with one or more embodiments, at least one of the one or more cooling holes 1038 can lie along lines that are angularly offset from the radial direction of the airfoil 1000. In other embodiments, at least one of the one or more cooling holes 1038 can be parallel, or substantially parallel, with the radial direction of the airfoil 1000. In another embodiment, at least one of the one or more cooling holes 1038 can include a plurality of segmented portions, i.e., a plurality of linear or arcuate sections joined together.

The one or more cooling holes 1038 can be in fluid communication with the cooling cavity 1036 and provide cooled fluid, e.g., cooled air, from the cooling cavity 1036 to the outer edge 1012 of the airfoil 1000.

Figure 12:
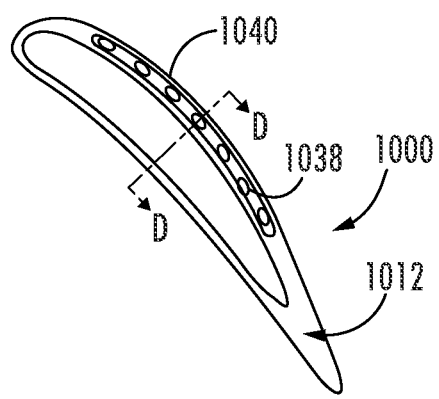
FIG. 12 is a top view of an airfoil as seen from an outer edge according to an exemplary embodiment of the present disclosure.
Figure 13:
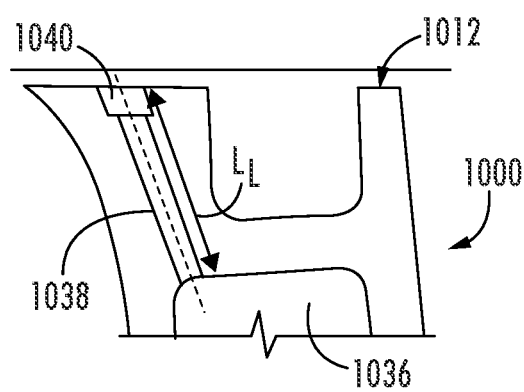
FIG. 13 is a cross-sectional view of the airfoil of FIG. 12 as seen along Line D-D according to an exemplary embodiment of the present disclosure.

FIGS. 12 and 13 illustrate another embodiment of the airfoil 1000. Similar to the embodiment illustrated in FIGS. 10 and 11, the airfoil 1000 of FIGS. 12 and 13 include one or more cooling holes 1038. However, unlike the embodiment illustrated in FIGS. 10 and 11, the cooling holes 1038 terminate at the outer edge 1012 at an enlarged area 1040. In an embodiment, the enlarged area 1040 can include a cooling hole extension substantially similar to the cooling hole 1038 but having a larger size and/or shape as compared to the underlying cooling hole 1038. By way of example, at least one of the one or more cooling holes 1038 can define a first dimension, e.g., a first diameter, as measured at a first location along the length, $L_L$, of the cooling hole 1038, and a second dimension, e.g., a second diameter, as measured at a second location along the length, $L_L$, of the cooling hole 1038 adjacent to the outer edge 1012, where the second size is greater than the first size. For instance, the second size can be at least 101% the first size, such as at least 105% the first size, such as at least 110% the first size, such as at least 125% the first size. In another embodiment, the second size is no greater than 1000% the first size.

In the depicted embodiment, the enlarged area 1040 comprises a channel extending between the one or more cooling holes 1038. That is, the enlarged area 1040 extends continuously between adjacent cooling holes 1038. In such a manner, the cooling holes 1038 can be in fluid communication with one another through the channel adjacent to the outer edge 1012 of the airfoil 1000. This can result in increased cooling and circulation along the outer edge 1012 of the airfoil 1000. In an embodiment, the channel connecting the cooling holes 1038 can have a consistent shape and/or size as measured along the channel. In another embodiment, at least one of the shape and size of the channel can fluctuate or vary at different locations along the channel. For example, the channel may have a minimum depth, as measured from the outer edge 1012, at a midpoint between adjacent cooling holes 1038.

Airfoils are generally permitted to deform by a prescribed tolerance during use. Such deformation can be created by materials operating at high velocities, under high loads, at high temperatures. It is not uncommon for the outer edges of airfoils to occasionally come into contact with the shroud. When such contact occurs, the use of cooling holes 1038 may be mitigated by scraped material from the outer edge of the airfoil closing the entrance to the cooling hole 1038. Use of an enlarged area 1040 at the outer edge 1012 of the cooling hole 1038 can prevent the cooling hole 1038 from closing shut if the airfoil 1000 radially expands during operation and contacts the shroud S. That is, the enlarged area 1040 of the cooling hole 1038 at the outer edge 1012 can allow for some degree of contact between the airfoil 1000 and shroud S without substantially, or entirely, closing the cooling hole 1038.

Figure 14:
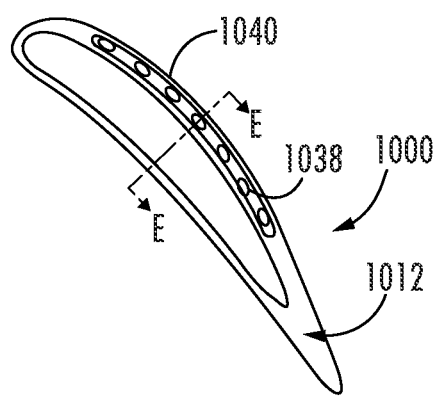
FIG. 14 is a top view of an airfoil as seen from an outer edge according to an exemplary embodiment of the present disclosure.
Figure 15:
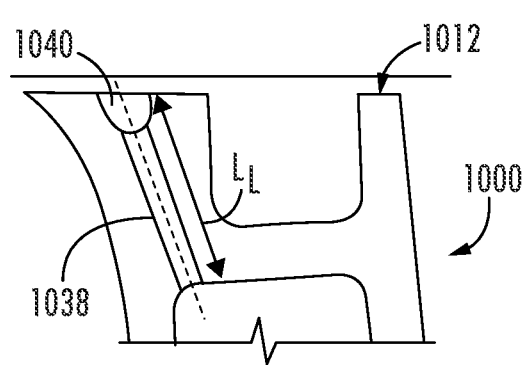
FIG. 15 is a cross-sectional view of the airfoil of FIG. 14 as seen along Line E-E according to an exemplary embodiment of the present disclosure.
Figure 16:
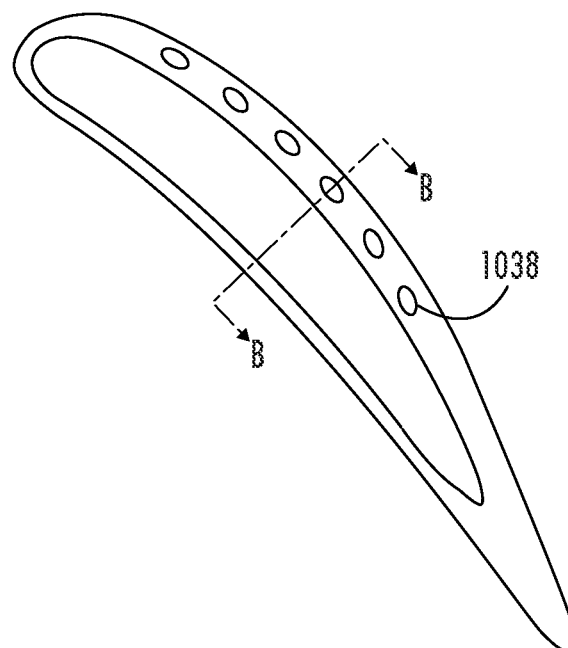
FIG. 16 is a top view of an airfoil as seen from an outer edge according to an exemplary embodiment of the present disclosure.
Figure 17:
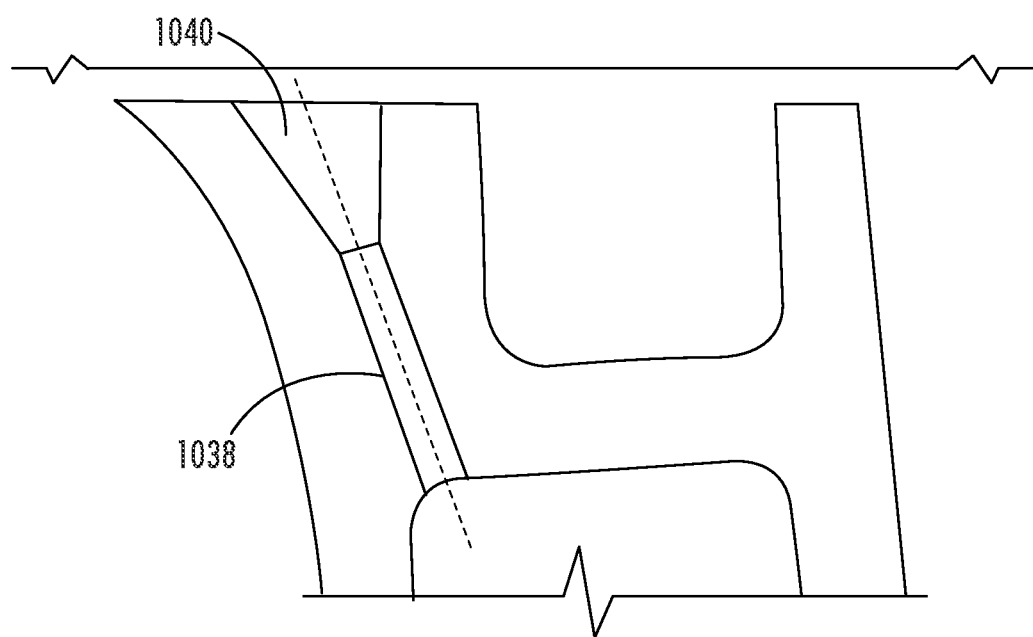
FIG. 17 is a cross-sectional view of the airfoil of FIG. 16 as seen along Line F-F according to an exemplary embodiment of the present disclosure.

FIGS. 14 and 15 depict another embodiment of the airfoil 1000 similar to those depicted in FIGS. 10 to 13. The enlarged area 1040 is depicted with a tapered profile, e.g., tapering from a size of the cooling hole 1038 to an enlarged size, as measured at the outer edge 1012. The tapered profile is shown having a curved taper. FIGS. 16 and 17 illustrate an embodiment of the airfoil 1000 where the enlarged area 1040 has a linear taper, as measured from the cooling hole 1038 to the outer edge 1012 of the airfoil 1000. Moreover, the embodiment illustrated in FIGS. 16 and 17 does not interconnect the enlarged area 1040 of adjacent cooling holes 1038. Instead, each enlarged area 1040 depicted in FIGS. 16 and 17 is part of a discrete cooling hole 1038. It should be understood that aspects of the exemplary embodiments illustrated in FIGS. 10 to 17 can be combined in any number of combinations and are not limited to those combinations as explicitly illustrated in the Figures.

In general, airfoils described herein can exhibit increased aerodynamic performance without adding unnecessary weight to the outer edge thereof. In such a manner, the airfoil described herein can generate increased performance without decreasing engine efficiency or durability.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Embodiment 1. An airfoil for a gas turbine engine defining a radial direction and an axial direction, the airfoil comprising: a flared portion extending from a suction surface of the airfoil at an outer edge of the airfoil along the radial direction; and a plenum disposed at the outer edge of the airfoil, the plenum having a suction-side sidewall and a pressure-side sidewall, wherein the suction-side sidewall has a first sidewall portion adjacent to a second sidewall portion disposed outside of the first sidewall portion along the radial direction, wherein the first sidewall portion defines a first angle with a radial direction of the airfoil as measured by an average angular offset between the radial direction and the first sidewall portion, wherein the second sidewall portion defines a second angle with the radial direction of the airfoil as measured by an average angular offset between the radial direction and the second sidewall portion, and wherein the first angle is greater than the second angle.

Embodiment 2. The airfoil of any one of the embodiments, wherein the outer edge of the airfoil is configured to be spaced apart from a shroud of the gas turbine engine by a clearance distance, CLR, wherein the second sidewall portion has a radial height, h, and wherein h/CLR is greater than 2.

Embodiment 3. The airfoil of any one of the embodiments, wherein a suction surface of the flared portion is angularly offset from the radial direction of the airfoil by a third angle as measured by an average angular offset between the radial direction and the surface of the flared portion, and wherein the third angle is approximately equal to the first angle.

Embodiment 4. The airfoil of any one of the embodiments, wherein the airfoil further comprises a cooling cavity disposed within a body of the airfoil, and wherein the cooling cavity is in fluid communication with the outer edge of the airfoil through one or more cooling holes extending between the cooling cavity and the outer edge of the airfoil.

Embodiment 5. The airfoil of any one of the embodiments, wherein at least one of the one or more cooling holes comprises a first size, as measured at a first radial location along the one or more cooling holes, and a second size, as measured at a second radial location along the one or more cooling holes, the second radial location being radially outside the first radial location, and wherein the second size is greater than the first size.

Embodiment 6. The airfoil of any one of the embodiments, wherein the second radial location corresponds with the outer edge of the airfoil.

Embodiment 7. The airfoil of any one of the embodiments, wherein the flared portion extends less than 80% of a chord length, c, of the airfoil, as measured at the outer edge of the airfoil.

Embodiment 8. The airfoil of any one of the embodiments, wherein the flared portion is spaced apart from a trailing edge of the airfoil and a leading edge of the airfoil.

Embodiment 9. The airfoil of any one of the embodiments, wherein the flared portion has a tapered profile.

Embodiment 10. The airfoil of any one of the embodiments, wherein the outer edge of the airfoil defines a recess disposed between and spaced apart from the plenum and a suction surface of the flared portion, as measured at the outer edge of the airfoil.

Embodiment 11. A gas turbine engine defining a radial direction, the gas turbine engine comprising: a shroud; and a turbine positioned at least partially inward of the shroud along the radial direction, the turbine having a plurality of turbine rotor blades, wherein at least one of the plurality of turbine rotor blades comprises: a flared portion extending from a suction surface of the airfoil at an outer edge of the airfoil; and a plenum disposed at the outer edge of the airfoil, the plenum having a suction-side sidewall and a pressure-side sidewall, wherein the suction-side sidewall has a first sidewall portion adjacent to a second sidewall portion disposed radially outside of the first sidewall portion, wherein the second sidewall portion is approximately normal relative to an inner surface of the shroud, and wherein the first sidewall portion is angularly offset from the second sidewall portion.

Embodiment 12. The gas turbine engine of any one of the embodiments, wherein the at least one of the plurality of turbine rotor blades comprises all of the plurality of turbine rotor blades.

Embodiment 13. The gas turbine engine of any one of the embodiments, wherein the outer edge of the airfoil is spaced apart from the shroud by a clearance distance, CLR, wherein the second sidewall portion has a radial height, h, and wherein h/CLR is greater than 2.

Embodiment 14. The gas turbine engine of any one of the embodiments, wherein the first sidewall portion and second sidewall portion lie along best fit lines that intersect at a junction having a junction angle, β, of at least 5°.

Embodiment 15. The gas turbine engine of any one of the embodiments, wherein the flared portion extends no greater than 80% of a chord length of the airfoil, as measured at the outer edge of the airfoil, and wherein the flared portion is spaced apart from a trailing edge of the airfoil and a leading edge of the airfoil.

Embodiment 16. The gas turbine engine of any one of the embodiments, wherein the airfoil further comprises a cooling cavity disposed within a body of the airfoil, and wherein the cooling cavity is in fluid communication with the outer edge of the airfoil through one or more cooling holes extending between the cooling cavity and the outer edge of the airfoil.

Embodiment 17. An airfoil for a gas turbine engine defining a radial direction and an axial direction, the airfoil comprising: a flared portion extending from a suction surface of the airfoil along less than 20% of a radial length of the airfoil, as measured from an outer edge of the airfoil along the radial direction, wherein the flared portion extends less than 80% of a chord length, c, of the airfoil, as measured at the outer edge of the airfoil.

Embodiment 18. The airfoil of any one of the embodiments, wherein the airfoil further comprises: a body having a plenum disposed at the outer edge, the plenum having a suction-side sidewall and a pressure-side sidewall, wherein the suction-side sidewall has a first sidewall portion adjacent to a second sidewall portion disposed radially outside of the first sidewall portion, wherein the second sidewall portion is approximately parallel with a radial direction of the airfoil, and wherein the first sidewall portion is angularly offset from the radial direction of the airfoil.

Embodiment 19. The airfoil of any one of the embodiments, wherein a suction surface of the airfoil is angularly offset from the radial direction of the airfoil by an angle, a, as measured by an average angular offset between the radial direction and the suction surface of the airfoil, and wherein the first sidewall portion is angularly offset by an angle of approximately α, as measured by an average angular offset between the radial direction and the first sidewall portion.

Embodiment 20. The airfoil of any one of the embodiments, wherein a surface of the flared portion is disposed at an angle, α, as measured relative to the radial direction, wherein a pressure surface of the airfoil is disposed at an angle, γ, as measured relative to the radial direction at an approximately same relative height in the radial direction as α, and wherein γ is less than α.

What is claimed is:

1. An airfoil for a gas turbine engine defining a radial direction, the airfoil comprising:
    a flared portion extending from a suction surface of the airfoil at an outer edge of the airfoil along the radial direction, the flared portion spaced apart from a trailing edge of the airfoil and a leading edge of the airfoil; and
    a plenum disposed at an outer edge of the airfoil, the plenum having a suction-side sidewall and a pressure-side sidewall;
    wherein the suction-side sidewall has a first sidewall portion adjacent to a second sidewall portion disposed radially outside of the first sidewall portion;
    wherein the first sidewall portion defines a first angle with the radial direction as measured by an average angular offset between the radial direction and the first sidewall portion; and
    wherein the second sidewall portion defines a second angle with the radial direction, less than the first angle, as measured by an average angular offset between the radial direction and the second sidewall portion.

2. The airfoil of claim 1, wherein the outer edge of the airfoil is configured to be spaced apart from a shroud of the gas turbine engine by a clearance distance, CLR, wherein the second sidewall portion has a radial height, h, and wherein h/CLR is greater than 2.

3. The airfoil of claim 1, wherein a suction surface of the flared portion is angularly offset from the radial direction of the airfoil by a third angle as measured by an average angular offset between the radial direction and the suction surface of the flared portion, and wherein the third angle is approximately equal to the first angle.

4. The airfoil of claim 1, wherein the airfoil further comprises a cooling cavity disposed within a body of the airfoil, and wherein the cooling cavity is in fluid communication with the outer edge of the airfoil through one or more cooling holes extending between the cooling cavity and the outer edge of the airfoil.

5. The airfoil of claim 4, wherein at least one of the one or more cooling holes comprises a first size, as measured at a first radial location along the one or more cooling holes, and a second size, as measured at a second radial location along the one or more cooling holes, the second radial location being radially outside the first radial location, and wherein the second size is greater than the first size.

6. The airfoil of claim 5, wherein the second radial location corresponds with the outer edge of the airfoil.

7. The airfoil of claim 1, wherein the flared portion extends less than 80% of a chord length, c, of the airfoil, as measured at the outer edge of the airfoil.

8. The airfoil of claim 1, wherein the flared portion has a tapered profile.

9. The airfoil of claim 1, wherein the outer edge of the airfoil defines a recess disposed between and spaced apart from the plenum and a suction surface of the flared portion, as measured at the outer edge of the airfoil.

10. A gas turbine engine defining a radial direction, the gas turbine engine comprising:
   a shroud; and
   a turbine positioned at least partially inward of the shroud along the radial direction, the turbine having a plurality of airfoils, with at least one airfoil in the plurality of airfoils comprising:
      a flared portion extending from a suction surface of the airfoil at an outer edge of the airfoil; and
      a plenum disposed at the outer edge of the airfoil, the plenum having a suction-side sidewall and a pressure-side sidewall;
   wherein the flared portion extends no greater than 80% of a chord length of the airfoil, as measured at an outer edge of the airfoil, and is spaced apart from a trailing edge and a leading edge of the airfoil;
   wherein the suction-side sidewall has a first sidewall portion adjacent to a second sidewall portion disposed radially outside of the first sidewall portion;
   wherein the second sidewall portion is approximately normal to an inner surface of the shroud; and
   wherein the first sidewall portion is angularly offset from the second sidewall portion.

11. The gas turbine engine of claim 10, wherein the outer edge of the at least one airfoil is spaced apart from the shroud by a clearance distance, CLR, wherein the second sidewall portion has a radial height, h, and wherein h/CLR is greater than 2.

12. The gas turbine engine of claim 10, wherein the first sidewall portion and the second sidewall portion lie along best fit lines that intersect at a junction having a junction angle, β, of at least 5°.

13. The gas turbine engine of claim 10, wherein the at least one airfoil further comprises a cooling cavity disposed within a body of the at least one airfoil, and wherein the cooling cavity is in fluid communication with the outer edge of the at least one airfoil through one or more cooling holes extending between the cooling cavity and the outer edge of the at least one airfoil.

14. The gas turbine engine of claim 10, wherein each airfoil in the plurality of airfoils comprises the flared portion and the plenum.

15. An airfoil for a gas turbine engine defining a radial direction, the airfoil comprising:
   a body having an outer edge and a plenum disposed at the outer edge, the plenum having a suction-side sidewall and a pressure-side sidewall; and
   a flared portion extending radially from a suction surface of the airfoil along less than 20% of a radial length of the airfoil, as measured from an outer edge of the airfoil, and also extending less than 80% of a chord length of the airfoil, as measured at the outer edge of the airfoil;
   wherein the suction-side sidewall has a first sidewall portion adjacent to a second sidewall portion disposed radially outside of the first sidewall portion;
   wherein the second sidewall portion is approximately parallel with the radial direction; and
   wherein the first sidewall portion is angularly offset from the radial direction.

16. The airfoil of claim 15, wherein a suction surface of the airfoil is angularly offset from the radial direction of the airfoil by an angle, α, as measured by an average angular offset between the radial direction and the suction surface of the airfoil, and wherein the first sidewall portion is angularly offset by an angle of approximately α, as measured by an average angular offset between the radial direction and the first sidewall portion.

17. The airfoil of claim 15, wherein a surface of the flared portion is disposed at an angle, a, as measured relative to the radial direction, wherein a pressure surface of the airfoil is disposed at an angle, γ, as measured relative to the radial direction at an approximately same relative height in the radial direction as α, and wherein γ is less than α.

* * * * *